US012615511B2

(12) United States Patent
Correia

(10) Patent No.: US 12,615,511 B2
(45) Date of Patent: Apr. 28, 2026

(54) EXCHANGE OF DEVICE SPECIFIC KEYS

(71) Applicant: The ADT Security Corporation, Boca Raton, FL (US)

(72) Inventor: Michael Patrick Correia, Tampa, FL (US)

(73) Assignee: The ADT Security Corporation, Boca Raton, FL (US)

( * ) Notice: Subject to any disclaimer, the term of this patent is extended or adjusted under 35 U.S.C. 154(b) by 314 days.

(21) Appl. No.: 18/390,823

(22) Filed: Dec. 20, 2023

(65) Prior Publication Data

US 2025/0211983 A1 Jun. 26, 2025

(51) Int. Cl.
*H04W 12/0471* (2021.01)
*H04W 76/15* (2018.01)

(52) U.S. Cl.
CPC ....... *H04W 12/0471* (2021.01); *H04W 76/15* (2018.02)

(58) Field of Classification Search
None
See application file for complete search history.

(56) References Cited

U.S. PATENT DOCUMENTS

| | | | |
|---|---|---|---|
| 10,764,128 B2 | 9/2020 | Kozura et al. | |
| 10,951,507 B1 * | 3/2021 | Slavin ..................... | H04W 4/80 |
| 11,096,111 B2 | 8/2021 | Wood | |
| 2017/0111755 A1 | 4/2017 | Cherian et al. | |
| 2020/0221296 A1 * | 7/2020 | Jiang ................... | H04L 63/0869 |

FOREIGN PATENT DOCUMENTS

| | | |
|---|---|---|
| CN | 111372231 A | 7/2020 |

OTHER PUBLICATIONS

International Search Report and Written Opinion dated Jan. 23, 2025 for International Application No. PCT/US2024/053415 filed Oct. 29, 2024, consisting of 12 pages.

* cited by examiner

*Primary Examiner* — Frantz Bataille
(74) *Attorney, Agent, or Firm* — Weisberg I.P. Law, P.A.

(57) ABSTRACT

A mobile device is described. The mobile device includes at least one processor and at least one memory. The mobile device, using a first communication protocol of a first communication link, receives from an end device a device specific key (DSK) associated with the end device. The mobile device transmits the DSK to a controller. In addition, using the first communication protocol of the first communication link, the mobile device transmits a trigger message that triggers the end device to transmit a priming message. The priming message triggers the controller to add the end device to a network usable for communication between the controller and the end device using an additional communication protocol that is different from the first communication protocol.

20 Claims, 8 Drawing Sheets

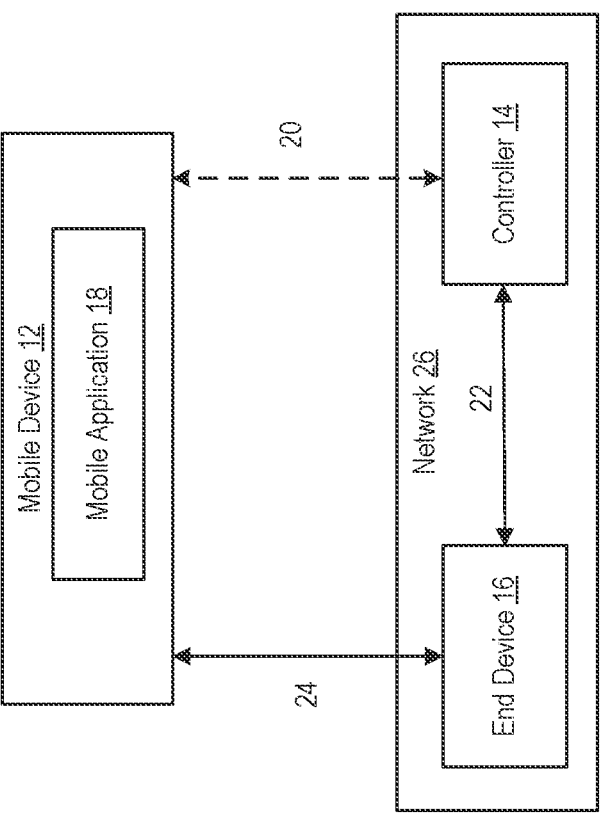
FIG. 1

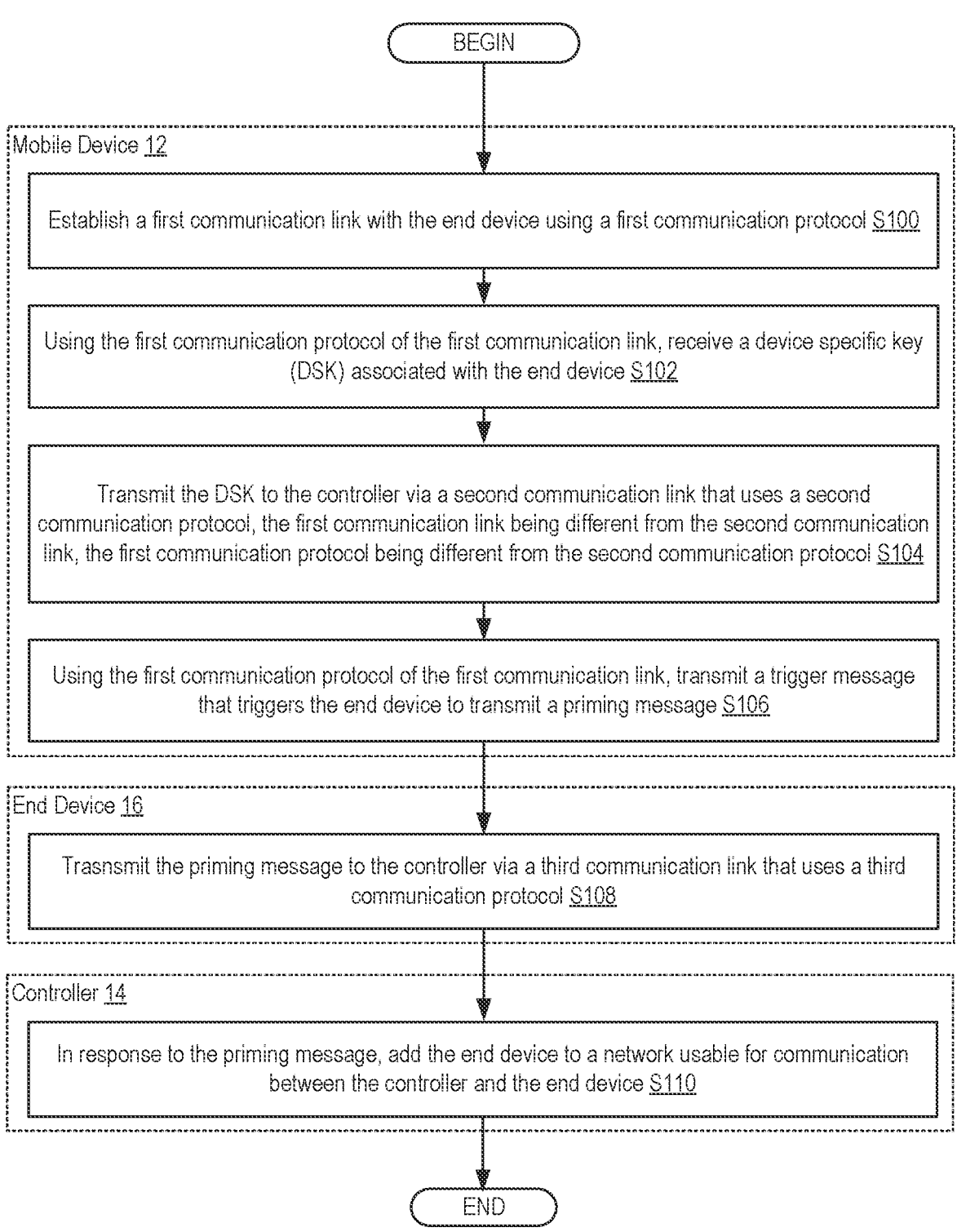

BEGIN

Mobile Device 12

Establish a first communication link with the end device using a first communication protocol S100

Using the first communication protocol of the first communication link, receive a device specific key (DSK) associated with the end device S102

Transmit the DSK to the controller via a second communication link that uses a second communication protocol, the first communication link being different from the second communication link, the first communication protocol being different from the second communication protocol S104

Using the first communication protocol of the first communication link, transmit a trigger message that triggers the end device to transmit a priming message S106

End Device 16

Trasnsmit the priming message to the controller via a third communication link that uses a third communication protocol S108

Controller 14

In response to the priming message, add the end device to a network usable for communication between the controller and the end device S110

END

FIG. 7

EXCHANGE OF DEVICE SPECIFIC KEYS

TECHNICAL FIELD

The present technology is generally related to the exchange of device specific keys (DSKs) for communication in one or more wireless communication networks.

BACKGROUND

The Z-WAVE protocol is a wireless communication protocol that allows the interconnection of end devices, such as access control devices, light control devices, thermostats, sensors, valves, etc. End devices are added to a network by a controller. Once the end devices are added to the network, the end devices are interconnected and can exchange data and control commands. An end device may be added to the network using an inclusion process.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 1 is a block diagram of an example system according to some embodiments of the present disclosure;

FIG. 7 is a flowchart of example functionality performed by components of the system of FIG. 1 and/or FIG. 2 according to some embodiments of the present disclosure.

DETAILED DESCRIPTION

Figure 2:
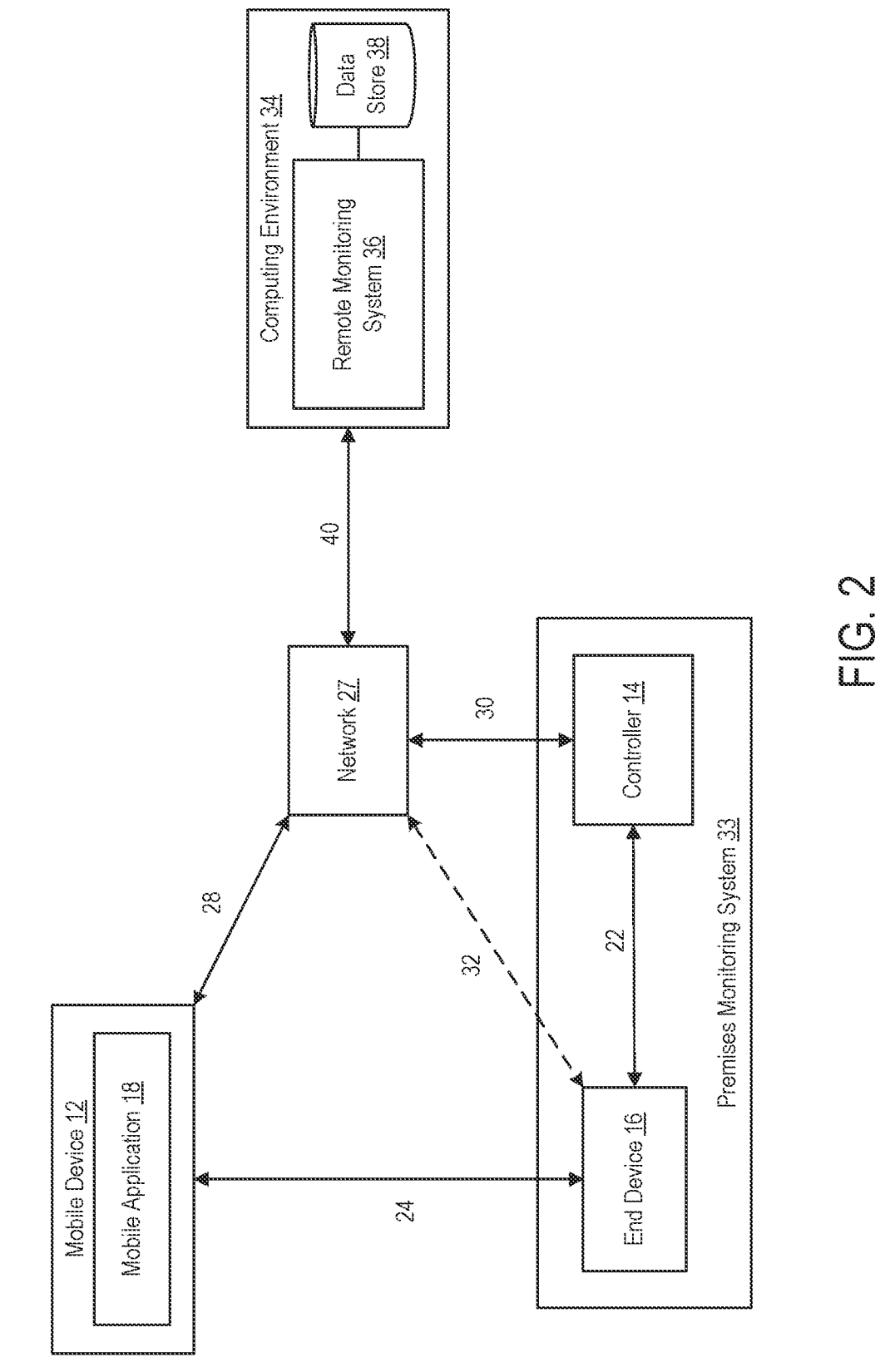
FIG. 2 is a block diagram of another example system according to some embodiments of the present disclosure.

The present disclosure relates to the exchange of DSKs that are specific to a first wireless communication protocol (e.g., Z-WAVE communication protocol) end devices, where the exchange occurs over a communication link that uses a second wireless communication protocol different from the first wireless communication protocol, such as BLU-ETOOTH Low Energy (BLE).

With reference to FIG. 1, shown is a block diagram of an example system 10 according to some embodiments of the present disclosure. System 10 may comprise mobile device 12, controller 14, and end device 16. Although one of each of mobile device 12, controller 14, and end device 16 is shown, system 10 may include various quantities of mobile devices 12, controllers 14, or end devices 16. For example, system 10 may include two or more end devices 16 configured to communicate with each other and controller 14.

Mobile device 12 may communicate with controller 14 via communication link 20 and with end device 16 via communication link 24. Communication link 20 may be a direct or indirect link to controller 14. Mobile device 12 may be a smartphone, tablet computer, personal computer, wearable device, or another type of device that a user can operate to communicate and interact with components of system 10. Mobile application 18 (which may include one or more software applications) may be installed in mobile device 12, and can be used to control, monitor, and/or interact with various aspects of a system 10. Mobile application 18 may also render one or more user interfaces that may facilitate adding and/or removing an end device 16 to and/or from a network 26, such as a Z-WAVE network. A Z-WAVE network may be a network in a mesh topology and/or a star topology and/or any other topology and configured according to the Z-WAVE communication protocol. In a nonlimiting example, in the star topology, end devices 16 may communicate directly with the controller 14, and in a mesh topology, at least some end devices 19 may communicate directly with the controller 14, while additional end devices 16 may communicate through one or more other end devices 16. Further, mobile application 18 of mobile device 12 may be configured to receive an input from a user and perform one or more actions. The actions may include establishing a connection via communication link 24 with end device 16, obtaining a DSK from end device 16, triggering end device 16 to transmit a priming message, and triggering controller 14 to add end device 16 to the network 26, etc.

Controller 14 may communicate with end device 16 via communication link 22, which may use a communication protocol, such as the Z-WAVE communication protocol or another low range and/or low power wireless communication protocol. Controller 14 may facilitate end devices 16 communicating with each other and controlling end devices 16. For example, controller 14 may add end device 16 to the network 26, which allows end device 16 to communicate with other end devices 16 using the communication protocol associated with network 26, e.g., the Z-WAVE communication protocol. Further, controller 14 may exchange security keys and other information to add the end device 16 to the network 26. In addition, controller 14 may transmit control signaling to end device 16, where the control signaling may include commands that cause end device 16 to perform an action. Controller 14 may also transmit a configuration to end device 16, which causes end device 16 to apply the configuration. Further, controller 14 may be configured to remove end device 16 from the network 26. In various embodiments, controller 14 may be referred to as a Z-WAVE smart hub, gateway, or controller.

End device 16 may comprise an access control device, a switch, a thermostat, a sensor, a light control device, a valve, an outlet plug, etc. In various embodiments, end device 16 may be referred to as an Internet of Things (IoT) device. End device 16 may be configured to perform one or more actions, e.g., based on end device type and configuration. For example, end device 16 may be an access control device, such as a lock configured to lock and unlock a door that provides access to a premises. End device 16 may be a light control device configured to turn on, turn off, dim a light of a light source, and control the angle of the light source, such as a light bulb.

In some embodiments, communication link 24 between mobile device 12 and end device 16 uses a point-to-point wireless communication protocol, and the communication link 22 between controller 14 and end device 16 uses another wireless communication protocol, such as a Z-WAVE communication protocol. The point-to-point wireless communication protocol of communication link 24 may comprise a BLUETOOTH communication protocol, BLE communication protocol, BLUETOOTH Smart communication protocol, etc. BLE communication protocol may allow devices to remain in sleep mode for a predetermined period of time, e.g., unless a connection is initiated. Further, BLE communication protocol may allow devices to conserve more energy than when BLUETOOTH communication protocol is used. For example, BLE communication protocol may be used to conserve battery charge in end device 16 (or controller 14), which may be powered by batteries. When a device, such as controller 14 and end device 16, uses BLE communication protocol, the device may be operated in a sleep mode, e.g., until data is transferred. Further, a device using the BLE communication protocol may transfer less data per unit of time while the device is active, when compared to BLUETOOTH communication protocol.

Any one of the point-to-point wireless communication protocols may be operated around 2.4 GHz. However, the Z-WAVE communication protocol may be operated in frequencies within 865-920 MHz, which is beneficial to avoid interference with signals associated with communication protocols such as BLE communication protocol and WI-FI communication protocol, which are operated around 2.4 GHz or 5 GHz.

FIG. 2 is a block diagram of another example system 10 according to some embodiments of the present disclosure. System 10 of FIG. 2 may include mobile device 12, controller 14, and end device 16 of FIG. 1, a network 27, premises monitoring system 33, and computing environment 34. In this nonlimiting example, network 27 may be configured to provide communication between components of system 10. For example, mobile device 12 may communicate with controller 14 via communication link 28, network 27, and communication link 30. Communication link 28, network 27, and communication link 30 shown in FIG. 2 between mobile device 12 and controller 14 may configured to provide the communication link 20 shown in FIG. 1 between mobile device 12 and controller 14. Further, mobile device 12 may communicate with computing environment 34 via communication link 28, network 27, and communication link 40. In various embodiments, communication links 28, 30, 40 may use various communication protocols, such as a WI-FI communication protocol, an Ethernet communication protocol, cellular communication protocol(s) such as 4G, 5G, 6G, etc. In some embodiments, network 27 comprises a gateway configured to connect to an internet service provider and provide access to the Internet. End device 16 may also be configured to communicate with other components of system 10 via communication link 32 and network 27.

End device 16, controller 14, and network 26 (shown in FIG. 1) may be comprised in premises monitoring system 33, which may provide premises monitoring system functionality via one or more functionalities provided by controller 14, end device 16, network 26, the components of computing environment 34, and any other component of system 10. For example, premises monitoring system 33 may be configured to provide functionality relating to premises monitoring. More specifically, premises monitoring system 33 may be used to detect burglaries, smoke, fires, carbon monoxide leaks, water leaks, etc. and report detected events to remote monitoring system 36. Additionally, the premises monitoring functionality performed by premises monitoring system 33 may include home automation functionality. Examples of home automation functionality include thermostat control, door lock control, lighting control, appliance control, etc. Further, controller 14 may be a premises monitoring system controller, such as an alarm system hub or panel, and end device 16 may be a premises device, such as a sensor, smart lock, smart doorbell, etc., that interacts with the premises monitoring system controller to provide premises monitoring system functionality.

Computing environment 34 may include one or more computing systems, such as server computer systems, that provide a remote monitoring system 36 and data store 38. Remote monitoring system 36 of computing environment 34 may be configured to provide remote monitoring services for multiple premises monitoring systems 33. For example, in the event that an open door, open window, glass break, etc. is detected by an end device 16 when a premises monitoring system 33 is in an armed state, controller 14 may transmit an alarm signal to remote monitoring system 36. In response, an agent associated with remote monitoring system 36 may initiate one or more actions, such as notifying first responders, such as police, fire, emergency medical responders, etc., and/or one or more designated users associated with the premises monitoring system 33.

Remote monitoring system 36 of computing environment 34 may be configured to communicate with components of system 10 and collect data associated with controller 14, end device 16, etc. Remote monitoring system 36 may also cause controller 14 and end device 16 to perform an action that may be related to adding end devices 16 to network 26.

Data store 38 may at least temporarily store data for retrieval, management and/or analysis. In particular, data store 38 may be configured to at least temporarily store content associated with controller 14, end device 16, network 26, and premises monitoring system 33.

Figure 3:
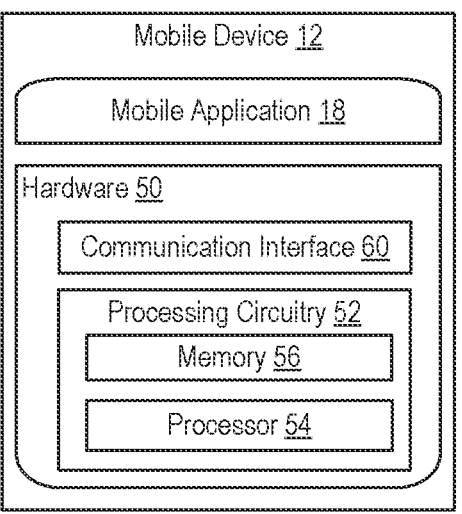
FIG. 3 is a block diagram of an example mobile device of the system of FIG. 1 and/or FIG. 2 according to various embodiments of the present disclosure.

Referring to FIG. 3, shown is a block diagram illustrating an example mobile device 12. As shown, mobile device 12 comprises hardware 50. The hardware 50 may include processing circuitry 52. The processing circuitry 52 may include one or more processors 54 and one or more memories 56. Each processor 54 may include and/or be associated with one or more central processing units, data buses, buffers, and interfaces to facilitate operation. In addition to or instead of a processor 54 and memory 56, the processing circuitry 52 may comprise other types of integrated circuitry that perform various functionality. Integrated circuitry may include one or more processors 54, processor cores, field programmable gate arrays (FPGAs), application specific integrated circuits (ASICs), graphics processing units (GPUs), Systems on Chips (SoCs), or other components configured to execute instructions. The processor 54 may be configured to access (e.g., write to and/or read from) the memory 56, which may comprise any kind of volatile and/or nonvolatile memory, e.g., cache, buffer memory, random access memory (RAM), read-only memory (ROM), optical memory, and/or erasable programmable read-only memory (EPROM). Further, memory 56 may be embodied in the form of one or more storage devices. The processing circuitry 52 may be configured to perform various functionality described herein. For example, computer instructions may be stored in memory 56 and/or another computer-readable medium that, when executed by processor 54, causes the processor 54 to perform various functionality described herein.

Hardware 50 may include communication interface 60 facilitating communication between mobile device 12 and one or more elements in system 10. For example, communication interface 60 may be configured for establishing and maintaining at least a wireless or wired connection with one or more elements of system 10 such as controller 14 (using one or more of communication links 20, 28, 30 and one or more communication protocols) and end device 16 using communication link 24 and one or more communication protocols such as BLE.

The processing circuitry 52 may be configured to control any of the methods and/or processes described herein and/or to cause such methods, and/or processes to be performed, e.g., by mobile device 12. The processing circuitry 52 may include one or more processors 54 for performing mobile device 12 functions described herein. The memory 56 is configured to store data, such as remote monitoring computing environment data and/or other information.

In some embodiments, the mobile application 18 (previously described with respect to FIGS. 1 and 2) may include instructions that, when executed by the processor 54 and/or processing circuitry 52, causes the processor 54 and/or processing circuitry 52 to perform the processes described herein with respect to mobile device 12. Accordingly, by having computer instructions stored in memory 56 accessible to the processor 54, the processor 54 may be configured to perform the actions described herein.

Figure 4:
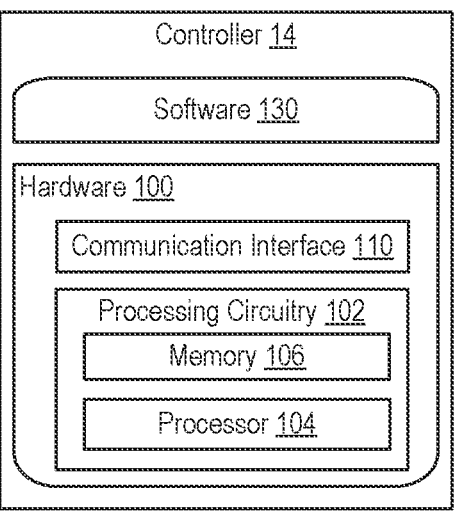
FIG. 4 is a block diagram of an example controller of the system of FIG. 1 and/or FIG. 2 according to various embodiments of the present disclosure.

FIG. 4 is a block diagram illustrating an example controller 14. As shown, controller 14 comprises hardware 100. The hardware 100 may include processing circuitry 102. The processing circuitry 102 may include one or more processors 104 and one or more memories 106. Each processor 104 may include and/or be associated with one or more central processing units, data buses, buffers, and interfaces to facilitate operation. In addition to or instead of a processor 104 and memory 106, the processing circuitry 102 may comprise other types of integrated circuitry that performs various functionality. Integrated circuitry may include one or more processors 104, processor cores, FPGAs, ASICs, GPUs, SoCs, or other components configured to execute instructions. The processor 104 may be configured to access (e.g., write to and/or read from) the memory 106, which may comprise any kind of volatile and/or nonvolatile memory, e.g., cache, buffer memory, RAM, ROM, optical memory, and/or EPROM. Further, memory 106 may be embodied in the form of one or more storage devices and/or non-transitory computer readable storage medium. The processing circuitry may be configured to perform various functionality described herein. For example, computer instructions may be stored in memory 106 and/or another computer-readable medium that, when executed by processor 104, causes the processor 104 to perform various functionalities such as, for example, receiving DSKs and adding end device 16 to network 26.

Hardware 100 may include communication interface 110 facilitating communication between controller 14 and one or more elements in system 10. For example, communication interface 110 may be configured for establishing and maintaining at least a wireless or wired connection with one or more elements of system 10 such as mobile device 12 and end device 16.

Controller 14 further has software 130 (which may include one or more software applications) stored internally in, for example, memory 106, or stored in external memory (e.g., database, storage array, network storage devices, etc.) accessible by the controller 14 via an external connection. Software 130 may include any software or program that configures processing circuitry 102 to perform the steps or processes of the present disclosure.

The processing circuitry 102 may be configured to control any of the methods and/or processes described herein and/or to cause such methods, and/or processes to be performed, e.g., by controller 14. The processing circuitry 102 may include one or more processors 104 for performing controller 14 functions described herein. The memory 106 is configured to store data and/or files, such as remote monitoring computing environment data and/or other information and/or data. In some embodiments, the software 130 may include instructions that, when executed by the processor 104 and/or processing circuitry 102, causes the processor 104 and/or processing circuitry 102 to perform the processes described herein with respect to controller 14. Accordingly, by having computer instructions stored in memory 106 accessible to the processor 104, the processor 104 may be configured to perform the actions described herein.

Figure 5:
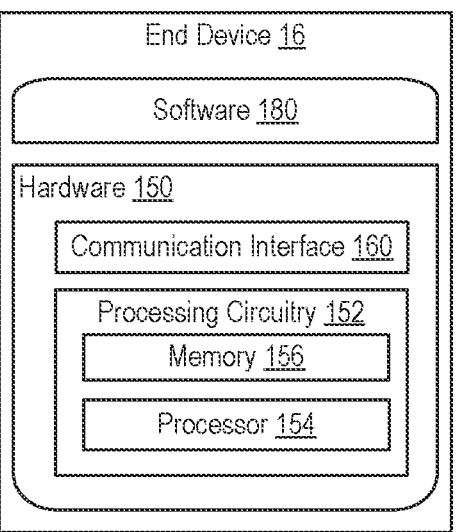
FIG. 5 is a block diagram of an example end device of the system of FIG. 1 and/or FIG. 2 according to various embodiments of the present disclosure.

FIG. 5 is a block diagram illustrating an example end device 16. As shown, end device 16 comprises hardware 150. The hardware 150 may include processing circuitry 152. The processing circuitry 152 may include one or more processors 154 and one or more memories 106. Each processor 154 may include and/or be associated with one or more central processing units, data buses, buffers, and interfaces to facilitate operation. In addition to or instead of a processor 154 and memory 156, the processing circuitry 152 may comprise other types of integrated circuitry that performs various functionality. Integrated circuitry may include one or more processors 154, processor cores, FPGAs, ASICs, GPUs, SoCs, or other components configured to execute instructions. The processor 154 may be configured to access (e.g., write to and/or read from) the memory 156, which may comprise any kind of volatile and/or nonvolatile memory, e.g., cache, buffer memory, RAM, ROM, optical memory, and/or EPROM. Further, memory 156 may be embodied in the form of one or more storage devices. The processing circuitry may be configured to perform various functionality described herein. For example, computer instructions may be stored in memory 156 and/or another computer-readable medium that, when executed by processor 154, causes the processor 154 to perform various functionality.

Hardware 150 may include communication interface 160 facilitating communication between end device 16 and one or more elements in system 10. For example, communication interface 160 may be configured for establishing and maintaining at least a wireless or wired connection with one or more elements of system 10, such as mobile device 12 and controller 14 via one or more wireless communication protocols such as, for example, a BLE communication protocol and Z-WAVE communication protocol. For example, communication interface 160 may comprise a BLE radio and a Z-WAVE radio for communicating using two different communication protocols.

End device 16 further has software 180 (which may include one or more software applications) stored internally in, for example, memory 156, or stored in external memory (e.g., database, storage array, network storage devices, etc.) accessible by the end device 16 via an external connection. Software 180 may include any software or program that configures processing circuitry 152 to perform the steps or processes of the present disclosure.

The processing circuitry 152 may be configured to control any of the methods and/or processes described herein and/or to cause such methods, and/or processes to be performed, e.g., by end device 16. Processing circuitry 152 may include one or more processors 154 for performing end device 16 functions described herein. The memory 156 is configured to store data, such as files and/or other information. In some embodiments, the software 180 may include instructions that, when executed by the processor 154 and/or processing circuitry 152, causes the processor 154 and/or processing circuitry 152 to perform the processes described herein with respect to end device 16. Accordingly, by having computer instructions stored in memory 156 accessible to the processor 154, the processor 154 may be configured to perform the actions described herein.

Figure 6:
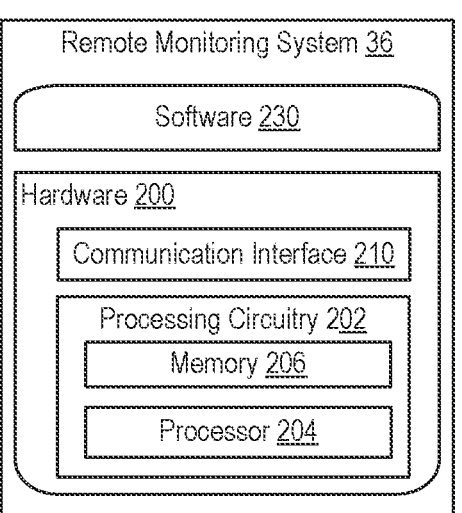
FIG. 6 is a block diagram of an example remote monitoring system of FIG. 2 according to various embodiments of the present disclosure.

FIG. 6 is a block diagram illustrating an example remote monitoring system 36 of computing environment 34. The remote monitoring system 36 may be provided by one or more servers. According to various embodiments, the servers can be located in a single geographical location (e.g., a datacenter) or distributed across multiple geographic locations. In some embodiments, the servers can operate as part of an elastic computing resource in which the allotted capacity of computing-related resources may vary over time.

As shown, remote monitoring system 36 comprises hardware 200. The hardware 200 may include processing circuitry 202. The processing circuitry 202 may include one or more processors 204 and one or more memories 206. Each processor 204 may include and/or be associated with one or more central processing units, data buses, buffers, and interfaces to facilitate operation. In addition to or instead of a processor 204 and memory 206, the processing circuitry 202 may comprise other types of integrated circuitry that performs various functionality. Integrated circuitry may include one or more processors 204, processor cores, FPGAs, ASICs, GPUs, SoCs, or other components configured to execute instructions. The processor 204 may be configured to access (e.g., write to and/or read from) the memory 206, which may comprise any kind of volatile and/or nonvolatile memory, e.g., cache, buffer memory, RAM, ROM, optical memory, and/or EPROM. Further, memory 206 may be embodied in the form of one or more storage devices. The processing circuitry 202 may be configured to perform various functionality described herein. For example, computer instructions may be stored in memory 206 and/or another computer-readable medium that, when executed by processor 204, causes the processor 204 to perform various functionality.

Hardware 200 may include communication interface 210 enabling remote monitoring system 36 to communicate with one or more elements in system 10. For example, communication interface 210 may be configured for establishing and maintaining at least a wireless or wired connection with one or more elements of system 10 such as mobile device 12, controller 14, end device 16, etc.

Remote monitoring system 36 further has software 230 (which may include one or more software applications) stored internally in, for example, memory 206, or stored in external memory (e.g., database, storage array, network storage devices, etc.) accessible by the remote monitoring system 36 via an external connection. Software 230 may include any software or program that configures processing circuitry 202 to perform the steps or processes of the present disclosure.

The processing circuitry 202 may be configured to control any of the methods and/or processes described herein and/or to cause such methods, and/or processes to be performed, e.g., by remote monitoring system 36. The processing circuitry 202 may include one or more processors 204 for performing remote monitoring system 36 functions described herein. The memory 206 is configured to store data, such as files and/or other information.

FIG. 7 is a flow diagram of an example method performed by components of system 10 (e.g., mobile device 12 and/or any of its components, controller 14 and/or any of its components, and end device 16 and/or any of its components, etc.). Mobile device 12 establishes (Block S100) a first communication link 24 with the end device 16 using a first communication protocol. In some embodiments, the first communication protocol is one or more of a point-to-point wireless communication protocol, low-range wireless communication protocol, or low-power wireless communication protocol, such as, for example, a BLE communication protocol. In addition, using the first communication protocol of the first communication link 24, mobile device 12 receives (Block S102) a DSK associated with the end device 16 and transmits (Block S104) the DSK to the controller 14 via a second communication link 20 that uses a second communication protocol. In one or more embodiments, the second communication protocol may be one of a Z-WAVE communication protocol, a WI-FI communication protocol or an Ethernet communication protocol. The first communication link 24 and the second communication link 20 are different, and the first communication protocol and the second communication protocol are different. Mobile device 12, using the first communication protocol of the first communication link 24, transmits (Block S106) to the end device 16 a trigger message that triggers the end device 16 to transmit a priming message. The end device 16, in response to the trigger message, transmits (Block S108) the priming message to the controller 14 via a third communication link 22 that uses a third communication protocol. For example, the third communication protocol may be a Z-WAVE communication protocol. The controller 14, in response to the priming message, adds (Block S110) the end device 16 to a network 26 usable for communication between the controller 14 and the end device 16.

In some embodiments, mobile device 12 receives confirmation from the controller 14 that the controller 14 received the DSK. The controller 14 transmits the trigger message in response to the confirmation. The confirmation may be received in a confirmation message or signaling that indicates the confirmation. The signaling may be radio signaling, infrared signaling, optical signaling, or any other type of signaling and may carry data indicating the confirmation that the controller 14 received the DSK. For example, the data may include a bit string where at least one bit indicates whether the controller 14 received the DSK.

In some other embodiments, after the end device 16 is added to the network 26, the end device 16 and the controller 14 communicate via a fourth communication link using a fourth communication protocol that is different at least from the first communication protocol and the second communication protocol. For example, the fourth communication protocol may be a Z-WAVE communication protocol.

In some embodiments, the priming message comprises a request to join the network 26.

In some other embodiments, the priming message triggers the controller 14 to exchange security keys used to control access to the network 26.

In some other embodiments, the end device 16 and the controller 14 communicate with each other using signals having a frequency within a frequency range between 865 MHz and 920 MHz when using the fourth communication protocol (e.g., a Z-WAVE communication protocol).

In some embodiments, the network has a network topology which may be a mesh topology or a star topology. As an example, the mesh network may be a Z-WAVE network.

Figure 8:
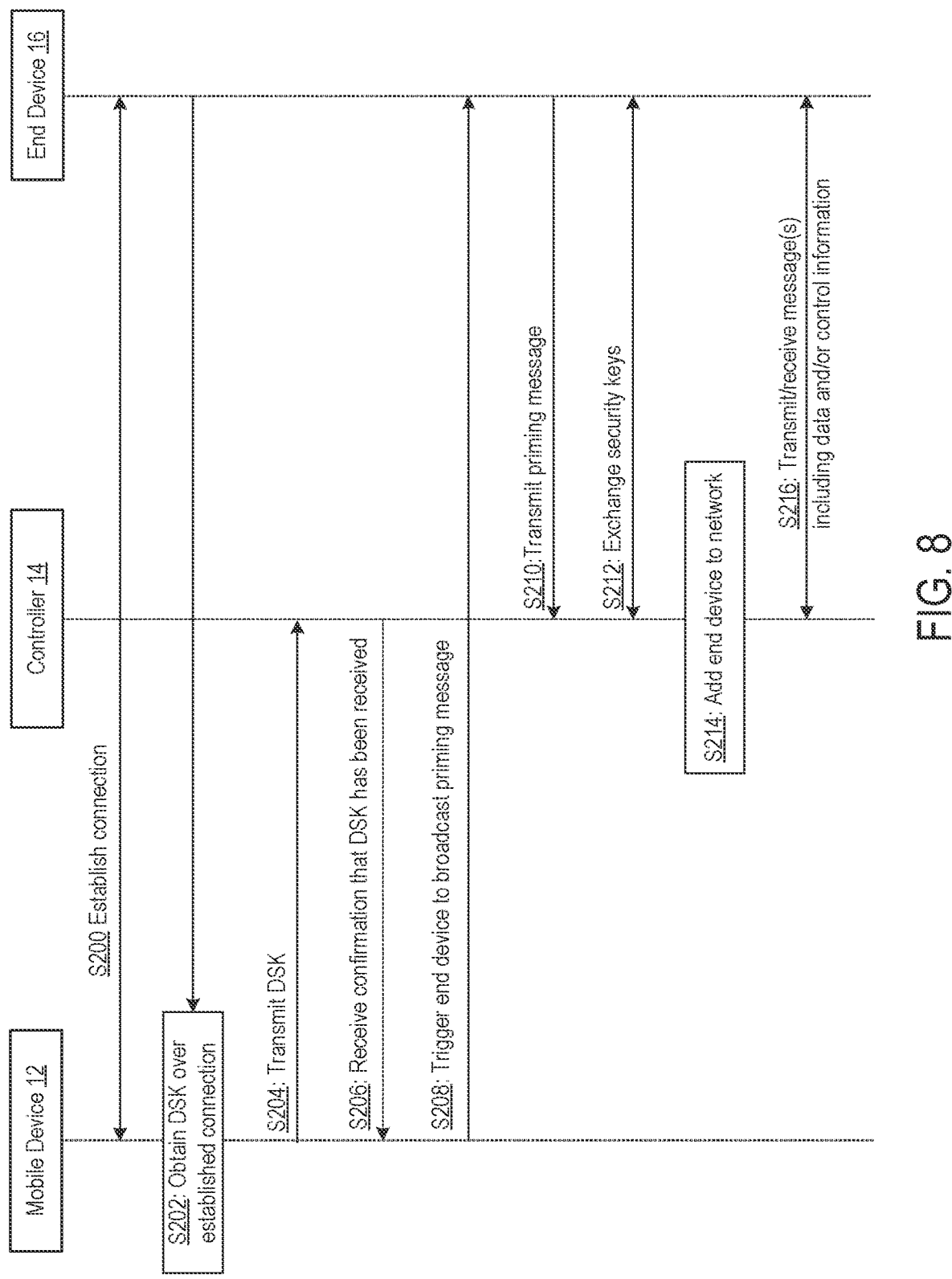
FIG. 8 is a sequence diagram of an example exchange of a DSK process performed by components of the system of FIG. 1 and/or FIG. 2 according to some embodiments of the present disclosure.

FIG. 8 is a sequence diagram of an example DSK exchange process performed by components of the system 10 according to some embodiments of the present disclosure. At step S200, mobile device 12 establishes a connection with end device 16, such as via communication link 24, using a wireless communication protocol, such as BLE. At step S202, mobile device 12 obtains a DSK specific to end device 16 via the established connection. In response to obtaining the DSK, at step S204, mobile device 12 may transmit the DSK to controller 14, and at step S206, receive a confirmation from controller 14 that controller 14 received the DSK. At step S208, mobile device 12 triggers end device 16 to transmit a priming message, thereby causing the priming message to be transmitted when the controller 14 is ready to receive the message. For example, the mobile device 12 may transmit to the end device 16 a message that causes the end device 16 to broadcast a SmartStart priming message pursuant to the Z-WAVE protocol. At step S212, controller 14 and end device 16 may exchange additional security keys to establish a secure connection. At step S214, controller 14, in response to steps S210 and S212, adds end device 16 to network 26 (e.g., Z-WAVE network). At step S216, controller 14 and end device 16 receive and transmit one or more messages, which may include data, control information, etc. The messages of step S216 may be transmitted using a communication protocol such as a Z-WAVE communication protocol.

The concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspect. Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions and/or acts specified in the flowchart and/or block diagram block or blocks.

The functions and acts noted in the blocks may occur out of the order noted in the operational illustrations. For example, two blocks shown in succession may in fact be executed substantially concurrently or the blocks may sometimes be executed in the reverse order, depending upon the functionality and/or acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In addition, unless mention was made above to the contrary, the accompanying drawings are not to scale. A variety of modifications and variations are possible in light of the above teachings without departing from the scope and spirit of the present disclosure.

What is claimed is:

1. A system comprising a mobile device, a controller, and an end device:

the mobile device comprising:

at least one processor; and at least one memory storing instructions that, when executed by the at least one processor, are configured to cause the at least one processor to:

cause the mobile device to establish a first communication link with the end device using a BLUETOOTH Low Energy (BLE) communication protocol;

using the BLE communication protocol of the first communication link, receive a device specific key (DSK) associated with the end device;

cause transmission of the DSK to the controller via a second communication link that uses a WI-FI communication protocol, the first communication link being different from the second communication link;

using the BLE communication protocol of the first communication link, cause transmission of a trigger message that triggers the end device to transmit a priming message;

the end device comprising:

at least one processor; and at least one memory storing instructions that, when executed by the at least one processor, are configured to cause the at least one processor to:

in response to establishing the first communication link with the mobile device and using the BLE communication protocol of the first communication link, cause transmission of the DSK to the mobile device;

in response to the trigger message, cause transmission of the priming message to the controller via a third communication link that uses a Z-WAVE communication protocol;

the controller comprising:

at least one processor; and at least one memory storing instructions that, when executed by the at least one processor, are configured to cause the at least one processor to:

receive the priming message; and in response to the priming message, add the end device to a network usable for communication between the controller and the end device.

2. The system of claim 1, wherein the instructions, when executed by the at least one processor of the mobile device, are further configured to cause the at least one processor of the mobile device to receive confirmation from the controller that the controller received the DSK, the trigger message being transmitted in response to the confirmation.

3. The system of claim 1, wherein after the end device is added to the network, the end device and the controller communicate via the network using the Z-WAVE communication protocol.

4. A mobile device comprising:

at least one processor; and at least one memory storing instructions that, when executed by the at least one processor, are configured to cause the at least one processor to:

using a first communication protocol of a first communication link, receive from an end device a device specific key (DSK) associated with the end device;

cause transmission of the DSK to a controller; and using the first communication protocol of the first communication link, cause transmission of a trigger message that triggers the end device to transmit a priming message, the priming message triggering the controller to add the end device to a network usable for communication between the controller and the end device using an additional communication protocol that is different from the first communication protocol.

5. The mobile device of claim 4, wherein the instructions, when executed by the at least one processor of the mobile device, are further configured to cause the at least one processor of the mobile device to cause the mobile device to establish the first communication link with the end device using the first communication protocol.

6. The mobile device of claim 4, wherein the DSK is transmitted to the controller via a second communication link that uses a second communication protocol, the first communication link and the second communication link being different, the first communication protocol and the second communication protocol being different.

7. The mobile device of claim 4, wherein the instructions, when executed by the at least one processor of the mobile device, are further configured to cause the at least one processor of the mobile device to receive confirmation from the controller that the controller received the DSK.

8. The mobile device of claim 7, wherein the trigger message is transmitted in response to the confirmation.

9. The mobile device of claim 4, wherein the priming message is transmitted via a third communication link that uses a third communication protocol different from the first communication protocol.

10. The mobile device of claim 4, wherein the priming message includes a request to join the network.

11. The mobile device of claim 4, wherein the priming message triggers the controller to exchange security keys used to control access to the network.

12. The mobile device of claim 4, wherein the first communication protocol is a BLUETOOTH Low Energy (BLE) communication protocol.

13. The mobile device of claim 4, wherein the additional communication protocol is a Z-WAVE communication protocol.

14. A method implemented by a mobile device, the method comprising:

receiving from an end device a device specific key (DSK) associated with the end device, the DSK being received using a first communication protocol of a first communication link;

transmitting the DSK to a controller; and transmitting a trigger message that triggers the end device to transmit a priming message, the trigger message being transmitted using the first communication protocol of the first communication link, the priming message triggering the controller to add the end device to a network usable for communication between the controller and the end device using an additional communication protocol that is different from the first communication protocol.

15. The method of claim 14, wherein the method further comprises establishing the first communication link with the end device using the first communication protocol.

16. The method of claim 14, wherein the DSK is transmitted to the controller via a second communication link that uses a second communication protocol, the first communication link being different from the second communication link, the first communication protocol being different from the second communication protocol.

17. The method of claim 14, wherein the method further comprises receiving a confirmation from the controller that the controller received the DSK.

18. The method of claim 17, wherein the trigger message is transmitted in response to the confirmation.

19. The method of claim 14, wherein the priming message is transmitted via a third communication link that uses a third communication protocol different from the first communication protocol.

20. The method of claim 14, wherein one or more of:

the priming message includes a request to join the network;

the priming message triggers the controller to exchange security keys used to control access to the network;

the first communication protocol is a BLUETOOTH Low
   Energy (BLE) communication protocol;
the additional communication protocol is a Z-WAVE
   communication protocol.

* * * * *